United States Patent [19]
Risse

[11] Patent Number: 6,017,384
[45] Date of Patent: Jan. 25, 2000

[54] NOZZLE ARRANGEMENT FOR A SCRUBBING COLUMN

[75] Inventor: Theo Risse, Werne, Germany

[73] Assignee: Lurgi Lentjes Bischoff GmbH, Essen, Germany

[21] Appl. No.: 09/137,545

[22] Filed: Aug. 20, 1998

[30] Foreign Application Priority Data

Aug. 28, 1997 [EP] European Pat. Off. .............. 97114910

[51] Int. Cl.$^7$ .................................................. B01D 47/06
[52] U.S. Cl. .................................. 96/244; 95/13; 95/187; 95/235; 96/265; 96/322; 261/116; 261/117
[58] Field of Search .............................. 96/243, 255, 265, 96/322, 244; 95/149, 187, 235, 8, 13; 261/115, 116, 117, 118

[56] References Cited

U.S. PATENT DOCUMENTS

| | | | |
|---|---|---|---|
| 1,430,696 | 10/1922 | Smith ......................................... | 95/149 |
| 5,173,093 | 12/1992 | Johnson et al. ........................... | 95/235 |
| 5,271,873 | 12/1993 | Nelson et al. ............................ | 261/116 |
| 5,620,144 | 4/1997 | Strock et al. ............................ | 239/557 |

FOREIGN PATENT DOCUMENTS

| | | |
|---|---|---|
| 0 524 729 | 1/1993 | European Pat. Off. . |
| 2 297 705 | 8/1996 | United Kingdom . |
| 95/25931 | 9/1995 | WIPO . |

*Primary Examiner*—Duane S. Smith
*Attorney, Agent, or Firm*—Herbert Dubno

[57] ABSTRACT

A nozzle arrangement in which the nozzles have a scrubber, especially for flow gas desulfurization, are laid in accordance with the following: (a) liquid concentrations of a component to be absorbed from a gas stream scrubbed in the column are measured above a plane of the nozzle assembly at N locations of a grid of equal area elements of a cross section of the column; (b) the N concentration values are compared with a predetermined value; (c) upon deviation of a measured concentration value from the predetermined value, a position of at least one of the nozzles is varied by selection of a length and location of an intermediate pipe section connecting the one of the nozzles to a respective branch pipe laterally thereon; and (d) repeating (a) through (c) until the concentration values measured above the plane are approximately equal except for at a wall region of the column.

8 Claims, 5 Drawing Sheets

NOZZLE ARRANGEMENT FOR A SCRUBBING COLUMN

FIELD OF THE INVENTION

My present invention relates to a nozzle assembly for a scrubbing column and, more particularly, to a nozzle assembly which can be used for a scrubbing column for flue gas desulfurization.

BACKGROUND OF THE INVENTION

A scrubber for flue gas desulfurization which can have a diameter of several meters, can be provided with a scrubbing liquid sump above which an absorption zone free from baffles or packing can be formed. Above the absorption zone there is at least one nozzle plane which is formed with a nozzle assembly comprising a distributor, branch pipes from that distributor and nozzles connected to the branch pipes for dispensing the scrubbing liquid. The spray cones from these nozzles can overlap and the nozzles can be connected to the branch pipes by intermediate pipe sections.

The flue gas to be scrubbed can pass through the scrubber in the same direction as the scrubbing liquid, i.e. in uniflow or in an opposite direction to the scrubbing liquid, i.e. in counterflow. The preferred mode of operation is a counterflow with the scrubbing liquid passing upwardly through the absorption zone.

The conventional nozzle arrangement can have one or more such nozzle planes and the distributor in each of these nozzle planes can lie along a symmetry axis of the scrubbing column cross section with the branch pipes running to the right and to the left from the distributor or manifold symmetrically and equidistantly. The intermediate pipe sections and their nozzles are likewise symmetrically distributed over the cross section and the nozzle arrangement. Such a system with downwardly directed nozzles is described in GB A 2 297 705.

In this system, the spray cones of the nozzles overlap and the system is designed to cover the scrubbing column cross section as such as possible uniformly from a geometric point of view.

However, when concentration measurements are made in the scrubbing gas stream above the nozzle planes, it is found that, in spite of the effort to maintain a uniform spray distribution over the entire cross section, there are local regions of higher contaminant levels in the gas stream. Apparently the scrubbed gas contains bands or regions which are not contacted sufficiently with the scrubbing liquid in the absorption zone. These regions of insufficient absorption reduce the absorption efficiency and frequently require lengthening of the absorption zone or increased numbers of nozzle planes or increased numbers of nozzles in each nozzle plane, all of which substantially increases the amount of scrubbing liquid used, the operating gas for the increased pumping which is necessary and the increased capital cost. In fact, in many cases scrubbing columns cannot be retrofitted to eliminate this drawback.

OBJECTS OF THE INVENTION

It is the principal object of the present invention to provide a nozzle arrangement for a scrubbing column of the type described which can ensure uniform scrubbing of a gas stream so that regions of low scrubbing effectiveness no longer arise.

Still another object of the invention is to provide a scrubber which has increased operating efficiency and which is free from the drawbacks outlined above.

SUMMARY OF THE INVENTION

These objects and others which will become apparent hereinafter are attained, in accordance with the invention by providing a scrubber or nozzle assembly for a scrubber wherein each nozzle is individually positioned by providing each nozzle with an intermediate pipe segment of individually selected length and location in the nozzle array based upon the following criteria:

a) the local concentrations of the components to be absorbed from a gas stream are measured above the nozzle plane at N locations in a grid covering the cross section of the scrubbing column and having N elements of equal cross section in the grid;

b) the N concentration values thus obtained are compared with a predetermined value;

c) upon a deviation from the predetermined value, the positions of one or more nozzles which spray the scrubbing liquid into the respective grid elements of that cross section are altered, by varying positions and lengths of their respective intermediate pipe sections; and d) steps a) to c) are repeated until the concentration values measured above the nozzle assembly, except for a wall region of the scrubbing column, have approximately equal value. The predetermined value of step b) is preferably the mean value of the N concentration measurements without concern for the targeted absorption efficiency. The nozzle distribution is found to be optimal when the concentration values for the various grid elements are equal and hence the concentration distribution in the scrubbed gas stream is highly uniform, i.e. bands of gas with concentration peaks of the contaminant or contaminants to be absorbed no longer arise.

The invention is based upon the discovery that the spread of the spray cones does not provide a suitable indication with respect to the nozzle distribution. However, a suitable measure of the nozzle distribution is the concentration distribution directly above the nozzle plane. If one follows steps a–d as set forth above, the nozzles can be positioned so as to give a geometrically unsymmetrical distribution which nevertheless enables elimination of the contaminant concentration peaks at certain zones of the gas stream traversing the absorption column. In doing so, each nozzle is individually positioned by selecting the positions and lengths of the intermediate pipe section of each nozzle.

The measurements made above the nozzle plane are repeated from cross sectional element to cross sectional element over the total number of elements N and at each point concentration deviations from a mean value of the concentration can be detected and the lengthened positions of the intermediate pipe segments can be adjusted, thereby unsymmetrically locating the nozzles. This changes how the spray cones overlap and impact the absorption zone. The concentration measurements of the cross section elements following the process of the invention show approximately equal values with respect to an absorbed contaminant. The lengths and positions of the intermediate pipe sections may be determined by computer simulations so that, based upon the comparisons, a computer, with which the various patterns of nozzles have been modeled, can give a location and length of an intermediate pipe section for a particular nozzle to adjust the difference between a particular concentration element and the mean to zero.

A computer simulation of the nozzle distribution can be effected by an algorithm such as the following:

a') in a first calculation step, the volume V in the absorption zone is subdivided into N qual volume elements $\Delta V_1$, $\Delta V_2 \ldots \Delta V_N$ all with a constant predetermined cross sectional area $\Delta F$ in the longitudinal direction of flow of the gas stream from liquid sump to the nozzle plane, b') the absorption gas flow quantities absorbed by the spray cones in the volume elements $\Delta \dot{m}_1, \Delta \dot{m}_2 \ldots \Delta \dot{m}_N$ are determined and compared with a predetermined value, c') upon deviations from the predetermined values at each such element, the positions of one or more nozzles are varied in the computer model and d') the steps b' and c' are repeated until the absorption gas flows $\Delta \dot{m}_1, \Delta \dot{m}_2 \ldots \Delta \dot{m}_N$ in all volume elements $\Delta V_1, \Delta V_2 \ldots \Delta VN$ have approximately equal values except for regions adjacent the wall of the scrubbing column. In this case, the predetermined value used in step b' is preferably the mean value of the absorption gas flows $\Delta \dot{m}_1, \Delta \dot{m}_2 \ldots \Delta \dot{m}_N$ for the volume elements $\Delta V_1, \Delta V_2 \ldots \Delta VN$.

The described steps for modeling the nozzle distribution is based upon the theory that the gas exchange transversely to the flow direction is not significant and hence there is no concentration equalization between regions of higher concentration and lower concentration by such transverse gas exchange. Steps a') to d') provide a methodology which satisfies practical needs. It will be apparent that in the regions of the wall of the scrubber, the interaction between the spray and the gas is not uniform or consistent with that elsewhere across the cross section and a smaller number of droplets are required to treat the gas. In the wall regions the nozzles can be so positioned that excess spraying into the gas does not occur.

The distributor of each nozzle assembly can advantageously lie along the axis of symmetry of the column cross section and the nozzles to either side of the distributor can be mirror-symmetrically arranged. In each half of the column cross section, however, it will be seen that the nozzle arrangement is not symmetrical.

The nozzles may spray hollow spray cones or spray cones in which the spray fills the cone. Of course any number of nozzles may be provided as desired.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
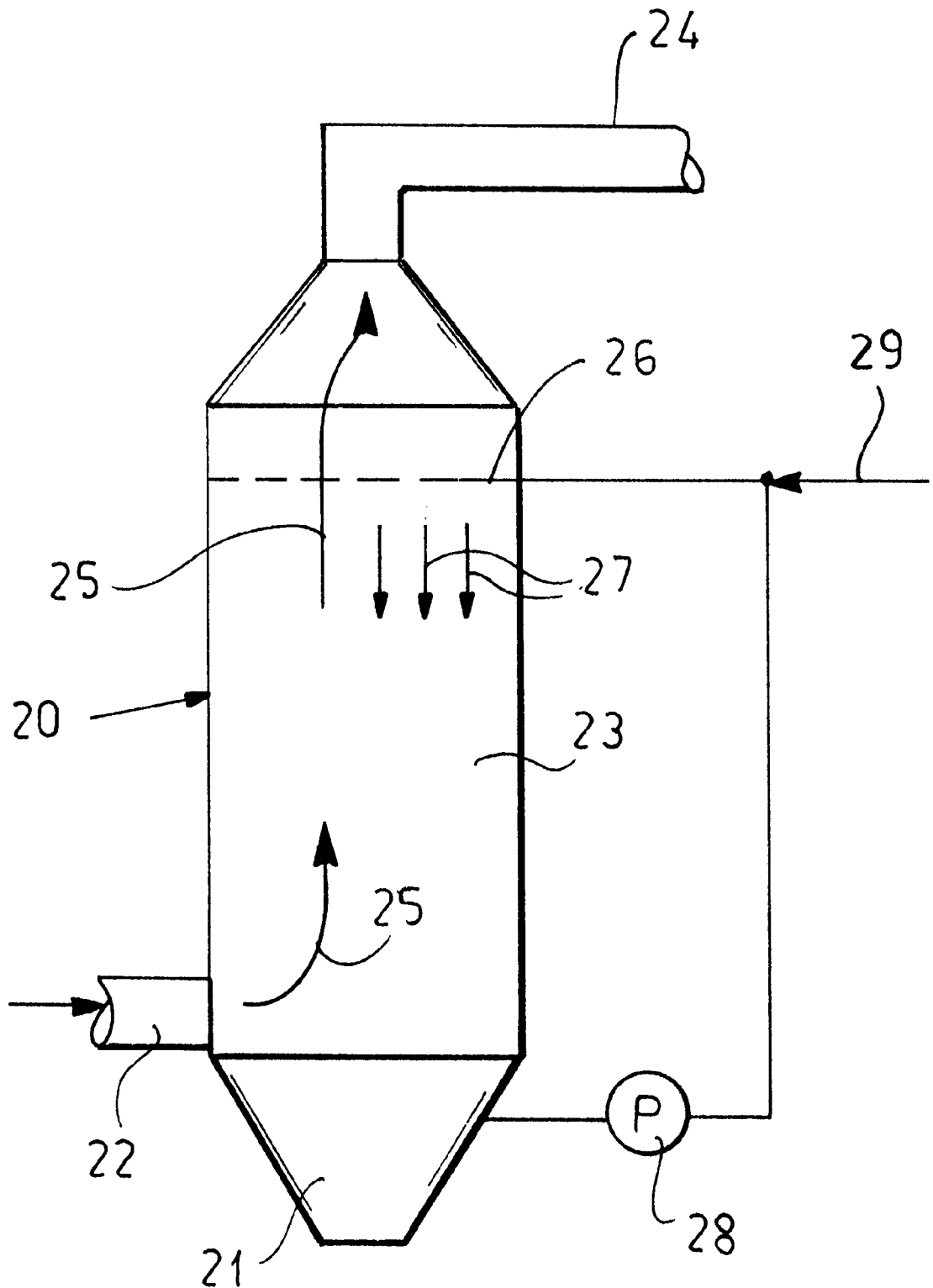
FIG. 4 is a diagrammatic cross sectional view of a scrubbing column according to the invention.

Referring first to FIG. 4, it can be seen that a scrubbing column according to the invention can be in the form of a tower 20 having a sump 21 for collecting the scrubbing liquid, an inlet 22 above the sump for feeding a flue gas to be sulfurized upwardly through an absorption zone 23 above the sump and an outlet 24 running to further gas cleaning equipment, if desired, or a stack. The absorption zone 23, traversed by the gas in the direction of the arrows 25, may be free from baffles or packing.

Figure 1:
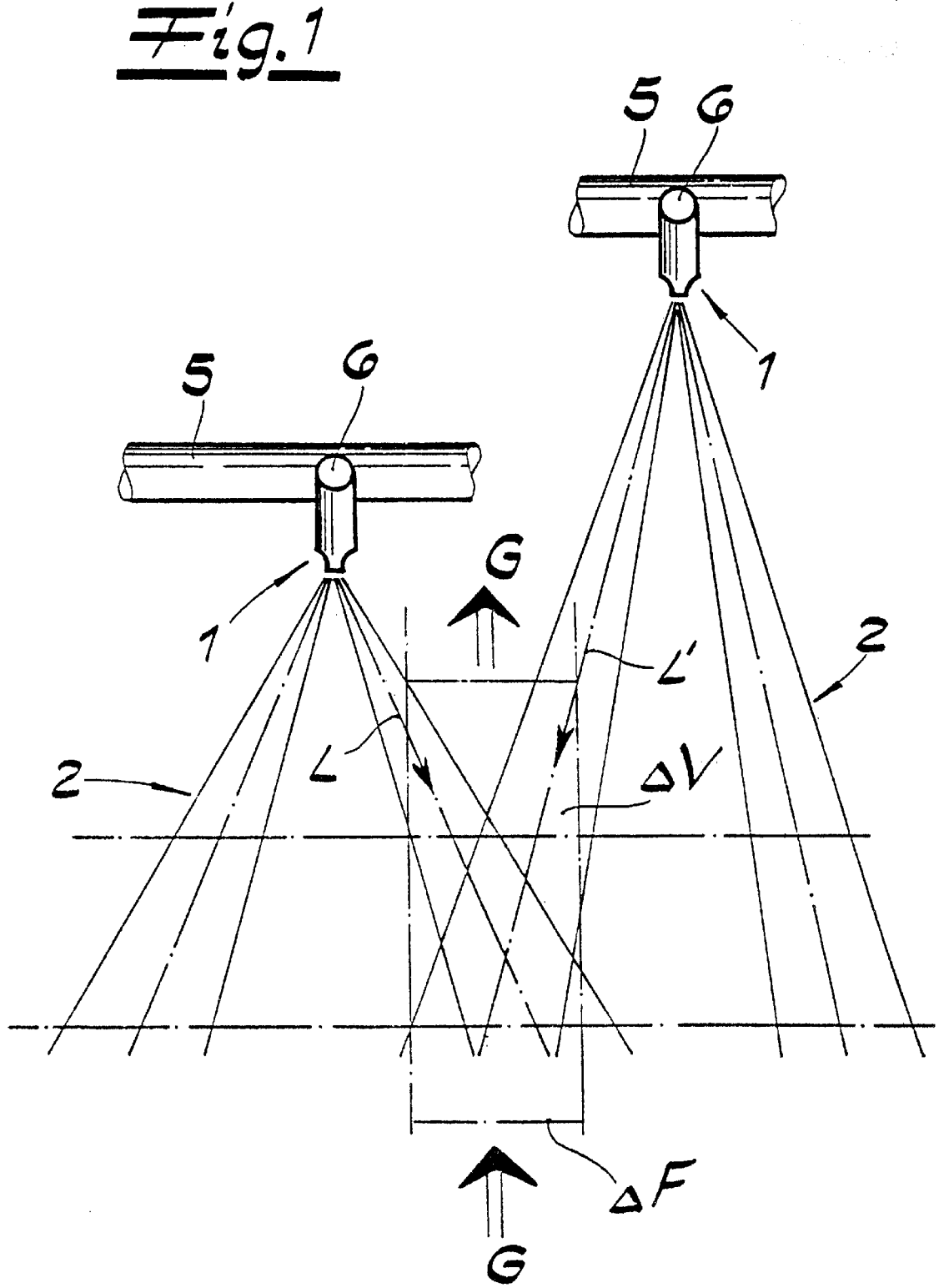
FIG. 1 is a diagram showing two spray planes according to the invention.
Figure 2:
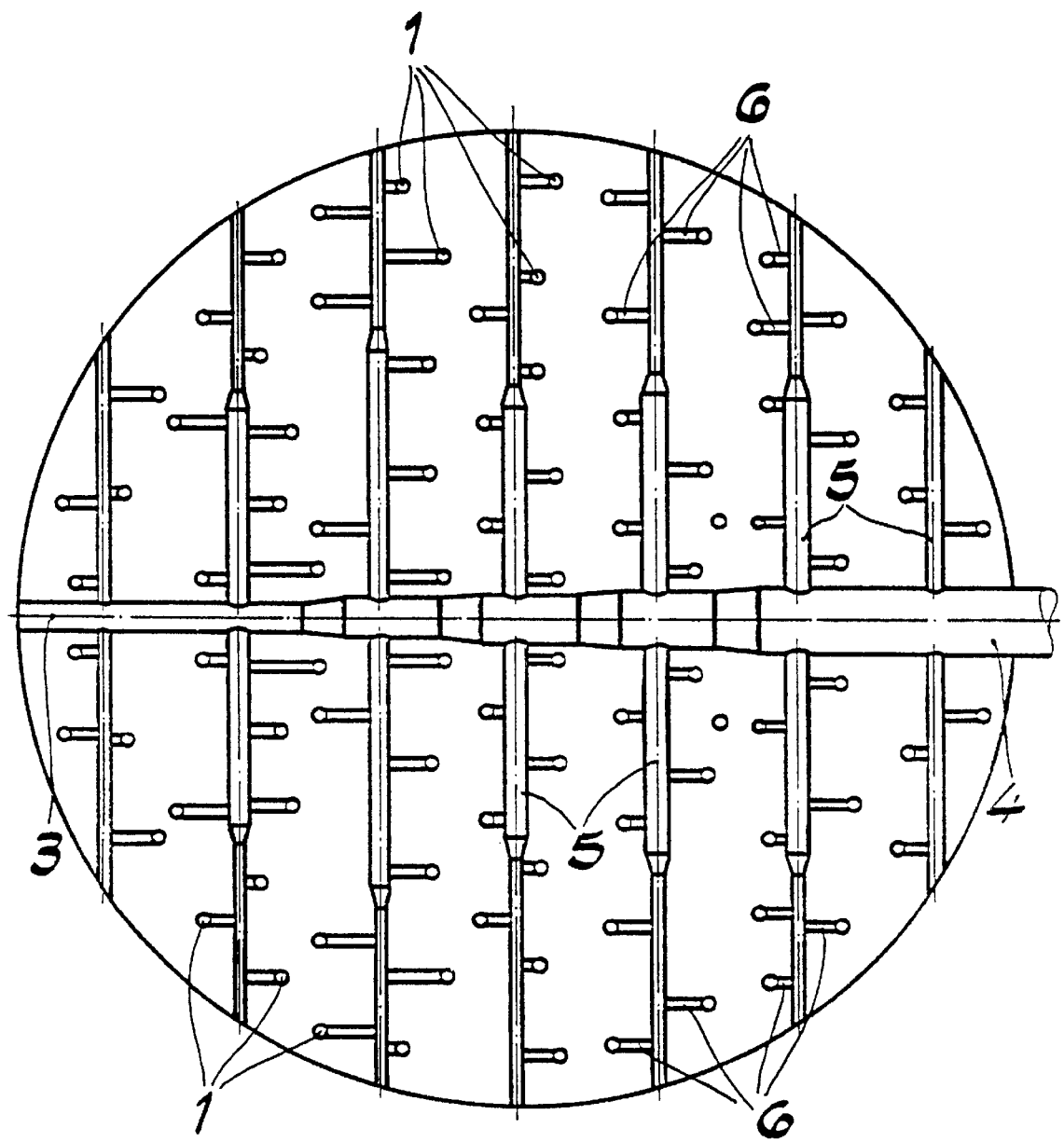
FIG. 2 is a plan view of a nozzle distribution according to the invention.

At the upper end of the absorption zone 23, a nozzle assembly 26 can be provided as shown in FIGS. 1 and 2. From the nozzle assembly, sprays of the absorption liquid are directed downwardly (arrows 27) as will be described in greater detail below. Absorption liquid, for example, a suspension of limestone in water, may be circulated from the sump 21 by a pump 28 to the nozzle assembly 26. Fresh water may be added at 29 and the scrubbing liquid from the sump may be supplied to a decanter, settling unit or the like from which solids may be recovered.

Figure 5:
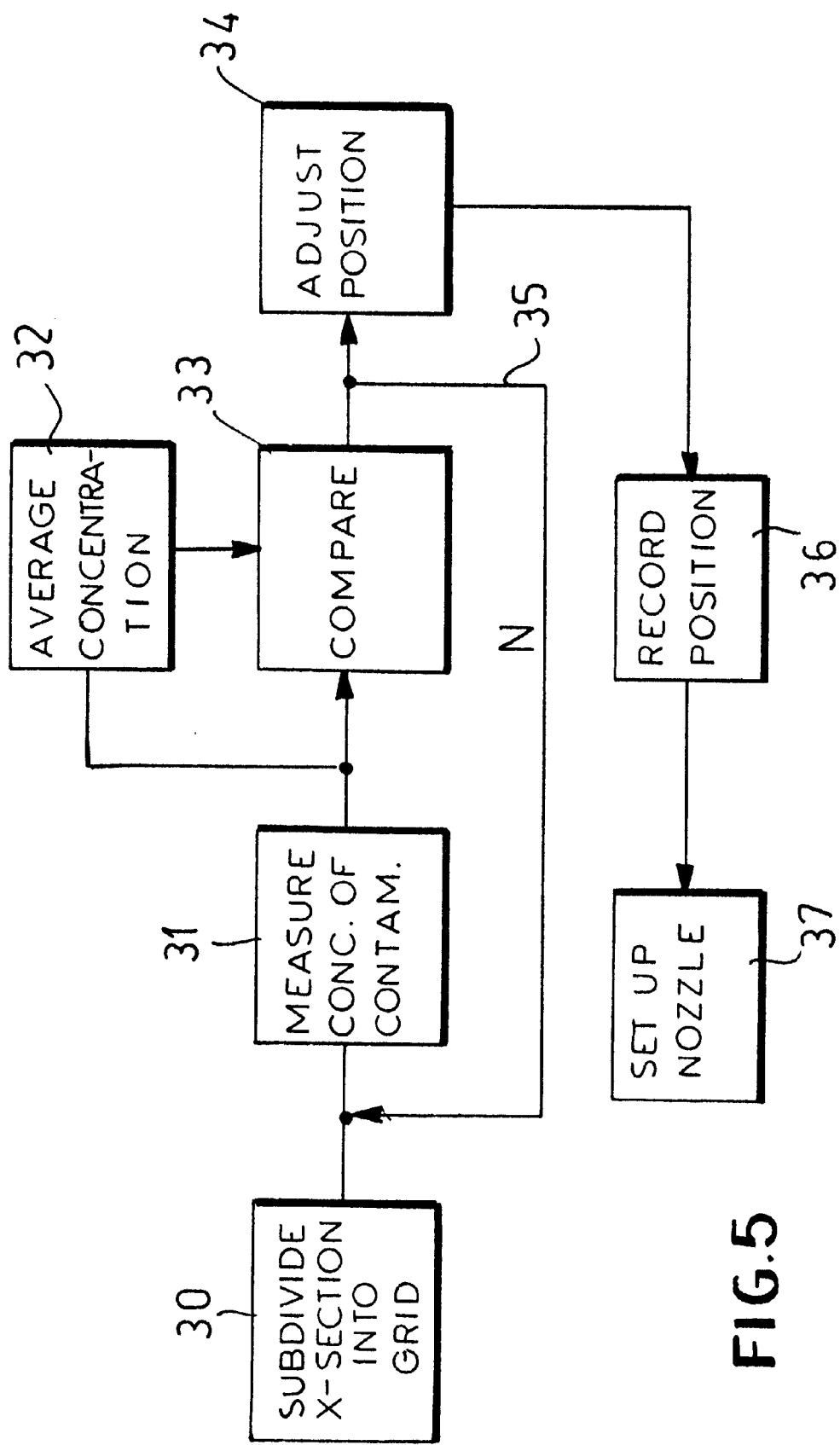
FIG. 5 is a block diagram illustrating the invention.

The principles of the invention are illustrated by the block diagram of FIG. 5 in which the cross section of the column can be subdivided into a grid of N elements and at 30 and the concentration of contaminant which is removed by absorption, namely, a sulfur compound can be measured for each element at 31. An average concentration can be generated at 32 and this average concentration compared with the measured value at each element N as represented by the comparison step 33. Based upon that comparison and by selection of an appropriate length and position of an intermediate pipe segment, the position of a nozzle can be adjusted at 34 and the process can be repeated as represented at 35 N times. The positions can be recorded, e.g. theoretically at 36 in the case of a modeled system and the final nozzle set up formed as shown at 37 which will yield a uniform concentration measurement throughout the cross section except for the wall regions. The nozzles at the wall region may be positioned to reduce excess scrubbing liquid flow at these regions.

As can be seen from FIG. 1, the nozzles 1 of the assembly have spray cones 2 which can overlap, the gas flow being represented at G and the nozzles here being shown to lie in two nozzle planes. The spray cones 2 can be in the form of jets whose axes are shown at L, the liquid passing downwardly in counterflow to the gas.

For establishing the nozzle distribution, the local $SO_2$ concentration above the uppermost nozzle plane is measured, as noted, at each of N cross section elements of a grid of N equal elements. These N concentration values are then compared with a predetermined value which can be the mean of the N concentration values. Upon deviation of a measured value from the predetermined value, a position adjustment of one or more nozzles affecting that element is necessary and that position change can be treated in terms of a variation in the length and location of an intermediate pipe section 6 connecting that nozzle 1 or those nozzles 1 with the respective branch pipes 5. The change in position is in a direction tending to reduce the difference and the steps are repeated until the concentration values are approximately equal except for the wall of the cross section.

The concentrations can be determined by a computer simulation, land in that case, the volume of the absorption zone 23 is subdivided into N equal volume elements $\Delta V_1$, $\Delta V_2 \ldots \Delta V_N$ with a constant cross sectional area $\Delta F$ in the longitudinal direction of gas flow G from liquid sump to the nozzle planes. In FIG. 1 one such volume element is represented at $\Delta V$. By a mass balance of the in and out-going flows of material G, L, L' and the applicable law for material exchange between the gas phase and liquid droplets, the absorption gas flow quantities absorbed in the volume elements $\Delta V_1, \Delta V_2 \ldots \Delta V_N$, are determined as values $\Delta \dot{m}_1$, $\Delta \dot{m}_2 \ldots \Delta \dot{m}_N$. The material flow through any element is associated with liquid components L, L' from the respective spray cones, for which, from the average droplet size, an exchange area F can be calculated. The calculation can use the following equation:

$$\Delta \dot{m} = \beta * F_{aus.} * \Delta c$$

β: material transfer coefficient $F_{aus}$: area of the droplets participating in the exchange of material Δc: concentration gradient between gas phase and liquid phase.

The calculation of the material transfer coefficient can be based upon the empirical equations defining exchange or transfer at the droplets, namely:

$$Sh = B + C*Re^m * Sc^n$$

Sh: Sherwood number

Re: Reynolds number

Sc: Schmidt number.

The absorption gas flow quantities $\Delta m_1, \Delta m_2 \ldots \Delta m_N$ in the volume elements $\Delta V_1, \Delta V_2 \ldots \Delta V_N$ of the spray cones are compared with a predetermined value. The predetermined value can be the mean value for the absorption gas flow quantities $\Delta m_1, \Delta m_2 \ldots \Delta m_N$ determined over all of the volume elements $\Delta V_1, \Delta V_2 \ldots \Delta V_N$.

In this model upon a deviation from the predetermined value, the positions of one or more nozzles are altered in the manner described and the steps repeated until the absorption gas flow quantities $\Delta m_1, \Delta m_2 \ldots \Delta m_N$ in all of the volume elements $\Delta V_1, \Delta V_2 \ldots \Delta V_N$ are substantially constant except for the wall region of the scrubbing column.

The method of the invention will give rise to a nozzle distribution as has been shown diagrammatically in FIG. 2 or 1 of the nozzle planes. In this nozzle arrangement, a distributor 4 lies along a symmetry axis 3 of the scrubbing column cross section and to the right and the left therefrom, branch lines 5 can extend. The nozzles 1 are attached by laterally projecting intermediate pipe segments 6 to the branch lines 5. The lengths and positions of the intermediate pipe sections 6 are so selected in accordance with aforedescribed method, that the gas flow through the nozzle arrangement consisting of the single nozzle plane or a plurality of such planes, has a uniform concentration of the measured contaminant substantially all over the flow cross section with the extent of the wall region of the scrubber.

In practice it has been found that, in spite of the fact that the process is practiced for all of the volume and area elements N previously noted, that there is a certain symmetry between the orientations of the nozzles on opposite sides of the symmetry plane 3 although within each half of the nozzle assembly there may not be any such symmetry.

Figure 3:
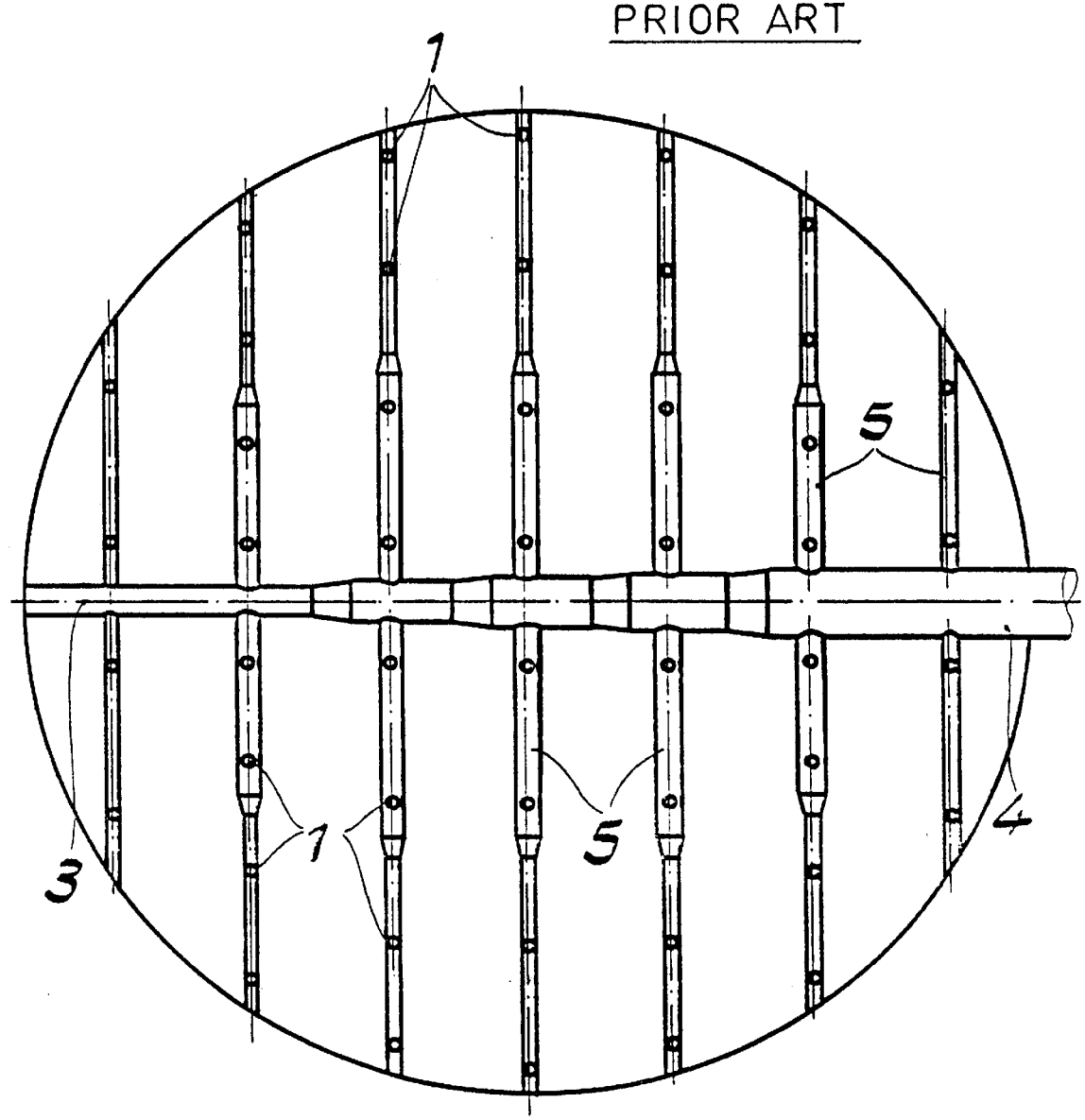
FIG. 3 is a diagram of a nozzle distribution according to prior art systems.

After the completed nozzle assembly has been mounted, further tests of the concentration of $SO_2$ can be made and if at that time there are any localities showing a deviation from the mean concentration of $SO_2$, the appropriate nozzles can be repositioned by changing the lengths and locations of the respective intermediate members to again restore the constant concentration measurement. FIG. 3 shows for comparison purposes a nozzle arrangement according to the state of the art where not only the branch pipes 5 are disposed equidistantly along the distributor 4, but the nozzles are equidistantly distributed along the branch pipes and all are attached to the branch pipes by intermediate pipe sections of the same length. Furthermore, the nozzles are not connected to the branch pipes by intermediate pipe sections which run laterally to the branch pipes, i.e. project from the sides thereof.

I claim:

1. A nozzle assembly for a scrubbing column having a scrubbing liquid sump, a baffle-free absorption zone above said sump, a distributor for a scrubbing liquid above the absorption zone, branch pipes extending from said distributor and nozzles connected to said branch pipes, the nozzles being affixed to said branch pipes in accordance with the following:

(a) liquid concentrations of a component to be absorbed from a gas stream scrubbed in said column are measured above a plane of said nozzle assembly at N locations of a grid of equal area elements of a cross section of said column;

(b) the N concentration values are compared with a predetermined value;

(c) upon deviation of a measured concentration value from the predetermined value, a position of at least one of said nozzles is varied by selection of a length and location of an intermediate pipe section connecting said one of said nozzles to a respective branch pipe laterally thereon; and (d) repeating (a) through (c) until the concentration values measured above said plane are approximately equal except for at a wall region of said column.

2. The nozzle assembly defined in claim 1 wherein said predetermined value is a mean value of the N measured concentration value.

3. The nozzle assembly defined in claim 1 wherein concentrations are measured above said plane after establishing a nozzle distribution of said assembly over said plane.

4. The nozzle assembly defined in claim 1 wherein the establishment of said nozzle distribution is effected based upon a computer simulation in which:

(a') in a first calculating step, the volume V of the absorption zone is subdivided into N equal volume elements $\Delta V_1, \Delta V_2 \ldots \Delta V_N$ and said elements have a predetermined cross sectional area ΔF in a longitudinal direction of flow of the gas stream from said sump to said nozzle plane;

(b') the absorption gas flow quantities $\Delta \dot{m}_1, \Delta \dot{m}_2 \ldots \Delta \dot{m}_N$ absorb in spray cones from said nozzles in said elements are determined and compared with a predetermined value for said absorption gas quantity;

(c') upon deviation of the measured value of $\Delta \dot{m}_1, \Delta \dot{m}_2 \ldots \Delta \dot{m}_N$ from the predetermined value of the absorption gas quantity, positions of one or more nozzles are reestablished to reduce that deviation; and (d') the process is repeated until the absorption gas quantity flows $\Delta \dot{m}_1, \Delta \dot{m}_2 \ldots \Delta \dot{m}_N$ in all of said volume elements $\Delta V_1, \Delta V_2 \ldots \Delta V_N$ are approximately the same except at wall regions of the column.

5. The nozzle assembly defined in claim 4 wherein the predetermined value of the absorption gas quantity is a mean value thereof over all of said volume elements.

6. The nozzle assembly defined in claim 1 wherein said distributor lies along a symmetry axis of the cross section of said column and nozzles on opposite sides of said symmetry axis are disposed mirror symmetrically.

7. The nozzle assembly defined in claim 1 wherein said nozzles have downwardly directed hollow spray cones.

8. The nozzle assembly defined in claim 1 wherein said nozzles have downwardly directed spray cones spraying droplets across an entire cross section of the spray cone.

* * * * *